(12) United States Patent
Kuo

(10) Patent No.: US 7,483,628 B2
(45) Date of Patent: Jan. 27, 2009

(54) OPTICAL VIEWFINDER OF A CAMERA HAVING A FUNCTION OF TAKING PHOTOGRAPHS

(75) Inventor: Claire Lee Jung Kuo, Taipei (TW)

(73) Assignee: Top Eight Industrial Corp., Taipei (TW)

( * ) Notice: Subject to any disclaimer, the term of this patent is extended or adjusted under 35 U.S.C. 154(b) by 307 days.

(21) Appl. No.: 11/524,893

(22) Filed: Sep. 22, 2006

(65) Prior Publication Data
US 2007/0086775 A1 Apr. 19, 2007

(30) Foreign Application Priority Data
Oct. 13, 2005 (CN) .................. 2005 2 0129702 U

(51) Int. Cl.
*G03B 13/02* (2006.01)
*G03B 13/06* (2006.01)
*G03B 13/08* (2006.01)
*G03B 1/60* (2006.01)
*H04N 5/66* (2006.01)
*G01C 3/00* (2006.01)

(52) U.S. Cl. .................. 396/373; 396/382; 396/385; 348/345; 352/171; 359/383; 33/227

(58) Field of Classification Search .................. 396/373, 396/382, 385; 359/383; 356/277; 352/171; 348/345; 33/227
See application file for complete search history.

(56) References Cited

U.S. PATENT DOCUMENTS

| 4,606,616 | A | * | 8/1986 | Parker ..................... 359/383 |
| 4,963,987 | A | * | 10/1990 | Ichiyoshi et al. ......... 348/375 |
| 2003/0147049 | A1 | * | 8/2003 | Jacumet .................. 352/171 |
| 2005/0068454 | A1 | * | 3/2005 | Afsenius ................. 348/345 |

* cited by examiner

*Primary Examiner*—Melissa J Koval
(74) *Attorney, Agent, or Firm*—Guice Patents PLLC

(57) ABSTRACT

The present invention discloses an optical viewfinder of a camera having the function of taking photographs, and the viewfinder comprises an objective module, a base, an eyepiece module and an upper casing. The objective module and the eyepiece module are fixed onto the front end and rear end of the base respectively and the upper casing is connected between the objective module and the eyepiece module and disposed in the middle section of the base. The simple structure of the invention is designed according to the principle of optical reflection and features a high resolution, an easy installation, and a convenient production, and the optical viewfinder is extensively used for cameras to substitute a high-cost electronic LCD screen.

10 Claims, 5 Drawing Sheets

OPTICAL VIEWFINDER OF A CAMERA HAVING A FUNCTION OF TAKING PHOTOGRAPHS

BACKGROUND OF THE INVENTION

1. Field of the Invention

The present invention relates to a viewfinder, and more particularly to an optical viewfinder of a camera having a function of taking photographs, and the optical viewfinder comes with a module design and thus is convenient to produce and manufacture and can achieve the effect of lowering the manufacturing costs.

2. Description of the Related Art

Most of the present camera viewfinders having the function of taking photographs are electronic viewfinders (EVF), and their operation principle is to install a micro liquid crystal display (LCD) inside the viewfinder sheltered by a camera body and hood, so that the external light will not be projected onto the micro LCD, and a user can see the micro LCD through an eyepiece of the viewfinder.

However, the present electronic viewfinder has a shortcoming that its display quality is inferior to that of a single-lens reflective camera, and the sharpness and the color of the pictures taken are not as good as that of the ones taken by the camera due to a lower resolution, so that the pictures taken will be rougher and include damascene. In addition, the electronic viewfinder cannot display the details of a picture taken, such as the eyes of a person are closed or opened, etc. Furthermore, the manufacturing cost of the electronic viewfinder is higher and the technology is more complicated, and improvements are needed for the electronic viewfinders of this sort.

SUMMARY OF THE INVENTION

In view of the forgoing shortcomings of the prior art, the inventor of the present invention based on years of experience in the design and sales of electronic viewfinders to conduct extensive researches and experiments to overcome the shortcomings of the prior art electronic viewfinders and greatly reduce the manufacturing cost, and finally invented an optical viewfinder of a camera having a function of taking photographs in accordance with the present invention.

The primary objective of the present invention is to provide an optical viewfinder of a camera having a function of taking photographs that uses the principle of optics to design an optical viewfinder to meet consumer requirements. In the meantime, the optical viewfinder of the invention is easy to produce and install, which can substitute the high-cost electronic LCD screen, and thus can greatly reduce costs to satisfy consumer requirements.

To achieve the foregoing objective, the solution of the present invention resides on that:

An optical viewfinder of a camera having a function of taking photographs comprises: an objective module having an object lens installed in a fixed base and a clamping ring engaged onto an opening at the front end of the objective module; a base, being a base body having an open top and a rectangular aslant surface therein for fixing a reflective mirror and reflecting the light received by the object lens; an eyepiece module installing a ground-glass eyepiece disposed at an upper casing of an aslant rear cylinder having an open bottom for focusing, so as to form the images thereon, having a plane glass lens engaged to an opening of a viewfinder frame at the rear of the upper casing of the rear cylinder, and a rear section of the bottom being coupled with a lower casing of the rear cylinder; and an upper casing of a front cylinder being a cover with an open bottom; such that the objective module and the eyepiece module are fixed to the front end and the rear end of the base respectively, and the upper casing of the front cylinder is disposed between the objective module and the eyepiece module and fixed to the middle section of the base.

Another objective of the present invention is to provide an optical viewfinder of a camera having a function of taking photographs, wherein the optical viewfinder is fixed and installed to the camera by a connecting means.

A further objective of the present invention is to provide an optical viewfinder of a camera having a function of taking photographs, wherein the fixed base includes an external decorative ring coupled to a base edge extended in a radial direction from the front of the fixed base, and the base includes at least two base pillars or base holes disposed at the front end of the base, and the fixed base includes a corresponding base wing or base pillars, and both being coupled by a connecting means such that the objective module is fixed to the front end of the fixed base.

Another further objective of the present invention is to provide an optical viewfinder of a camera having a function of taking photographs, wherein the viewfinder frame installs a viewfinder rubber. In addition, the upper casing of the rear cylinder includes a cover wing extended downward from the front end and rear end of the upper casing of the rear cylinder and inserted into a wing groove at a lower casing of the rear cylinder, and both being coupled by a connecting means, such that the lower casing of the rear cylinder is fixed to the rear section of the upper casing of the rear cylinder. Further, the lower casing of the rear cylinder includes a wing plate protruded from the front end of the lower casing of the rear cylinder, and the base includes a plate hole disposed on a sidewall at the rear end of the base, and both being coupled by a connecting means, such that the eyepiece module is fixed to the rear end of the base.

Another objective of the present invention is to provide an optical viewfinder of a camera having a function of taking photographs, wherein the ground glass eyepiece is made of a plane ground glass, or the ground glass eyepiece is made of a spiral ground glass.

Another further objective of the present invention is to provide an optical viewfinder of a camera having a function of taking photographs further comprising a control section, and the control section includes a button cover installed between the base and the upper casing of the front cylinder, and the button cover includes a focus button and a shutter.

BRIEF DESCRIPTION OF THE DRAWINGS

FIG. 1 is an exploded view of an optical viewfinder of the invention;

FIG. 2 is a schematic view of the modules of an optical viewfinder of the invention;

FIG. 3 is a perspective view of an optical viewfinder of the present invention;

FIG. 4 is a cross-sectional view of an optical viewfinder of the invention; and

FIG. 5 is a perspective view of an optical viewfinder being installed onto a camera having a function of taking photographs according to the invention.

DETAILED DESCRIPTION OF THE PREFERRED EMBODIMENTS

Figure 1:
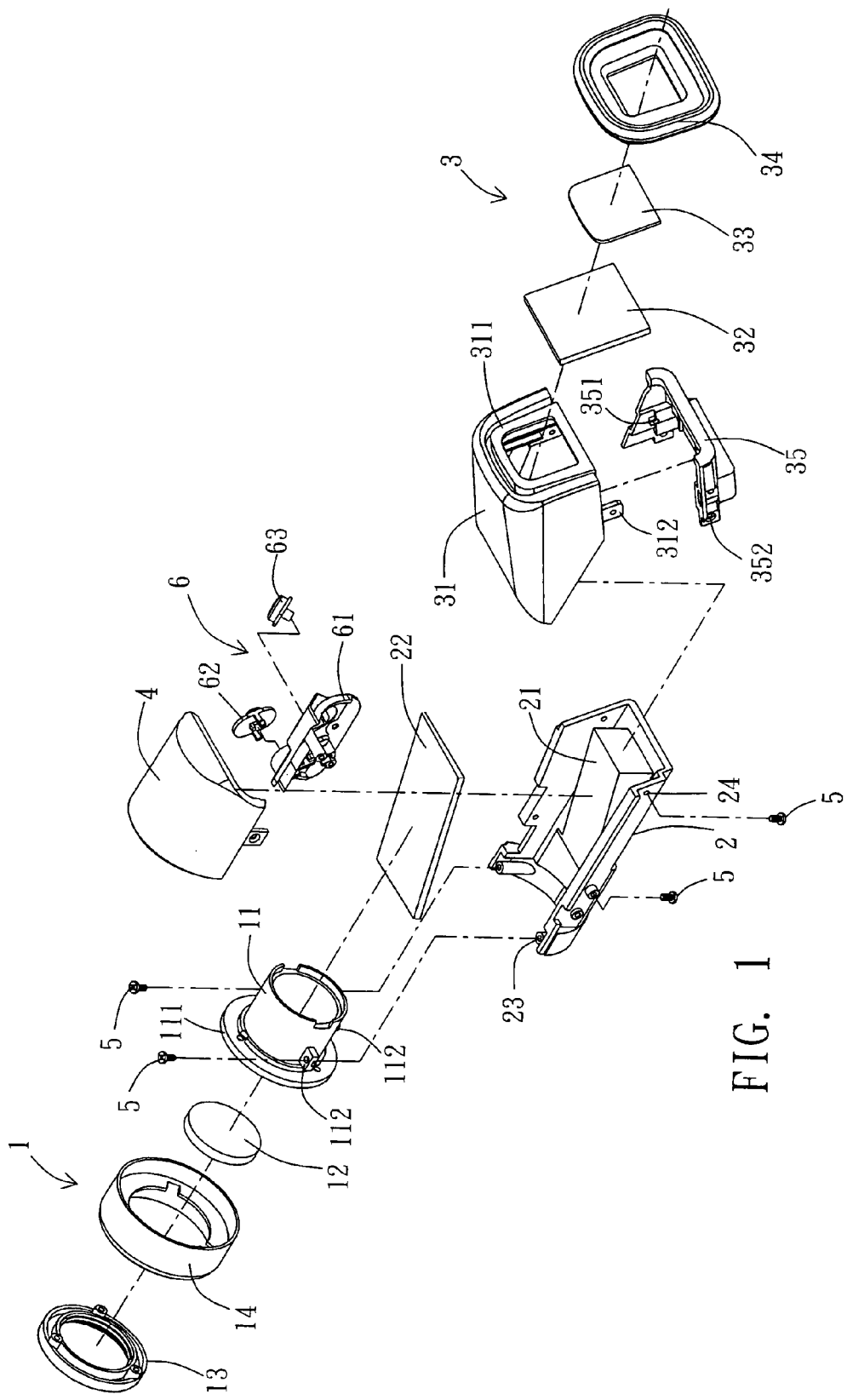
Referring to FIG. 1 to FIG. 5, it will provide more detailed technology of the invention.

Referring to FIGS. 1 to 4, an optical viewfinder of a camera having a function of taking photographs in accordance with the present invention comprises an objective module 1, a base 2, an eyepiece module 3, and an upper casing 4 of a front cylinder.

The objective module 1 captures a view through an object lens 12, and the light is incident from the object lens 12. The objective module 1 includes an object lens 12 installed in a fixed base 11 and a clamping ring 13 engaged onto an opening at the front end of the objective module 1, so that the object lens 12 is fixed in the fixed base 11. To improve the artistic look of the objective module 1, an external decorative ring 14 is installed onto a base edge 111 extended along the radial direction from the front end of the fixed base 11. In addition to the decoration effect, the decorative ring 14 also has the function of blocking the light.

The base 2 is a base body having an open top and has a rectangular aslant surface 21 therein for fixing a reflective mirror 22 for reflecting the light received by the objective module 1. To fix the objective module 1 to the base 2, the front end of the objective module 1 includes at least two base pillars or base holes 23 and the fixed base 11 includes a corresponding base wing or base pillar 112, and both are coupled by a connecting means 5 such as a screw, so that the objective module 1 is fixed to the front end of the base 2.

The eyepiece module 3 is provided for receiving the reflected light and forming an image (positive image), so that the viewer can view the image. The eyepiece module 3 installs a ground glass eyepiece 32 in an aslant upper casing 31 of a rear cylinder having an open bottom for forming images, and a plane glass lens 33 is engaged to an opening at the rear end of a viewfinder frame 311, so that the viewer can see the picture taken and the plane glass lens 33 also can protect the ground glass eyepiece 32.

To make the eye contact with the viewfinder frame 311 more comfortable, a viewfinder frame rubber 34 is connected to the viewfinder frame 311. In addition, the rear section of the bottom of the upper casing 31 of the rear cylinder is connected to a lower casing 35 of a rear cylinder. In the figures, both of the front end and rear end of the upper casing 31 of the rear cylinder have a cover wing 312, and inserted into a wing groove 351 disposed at the lower casing 35 of the rear cylinder to connect the lower casing 35 of a rear cylinder to the front rear section of the bottom of upper casing 31 by a connecting means 5 such as a screw. Further, a wing plate 352 is protruded from the front end of the lower casing 35 of the rear cylinder, and a plate hole 24 is disposed at the corresponding sidewall at the rear end of the base 2, such that the eyepiece module 3 is fixed to the rear end of the base 2 by a connecting means 5 such as a screw.

The ground glass eyepiece 32 could be made of a plane ground glass, but is preferably made of a spiral ground glass to achieve the function of obtaining a clear image.

Figure 2:
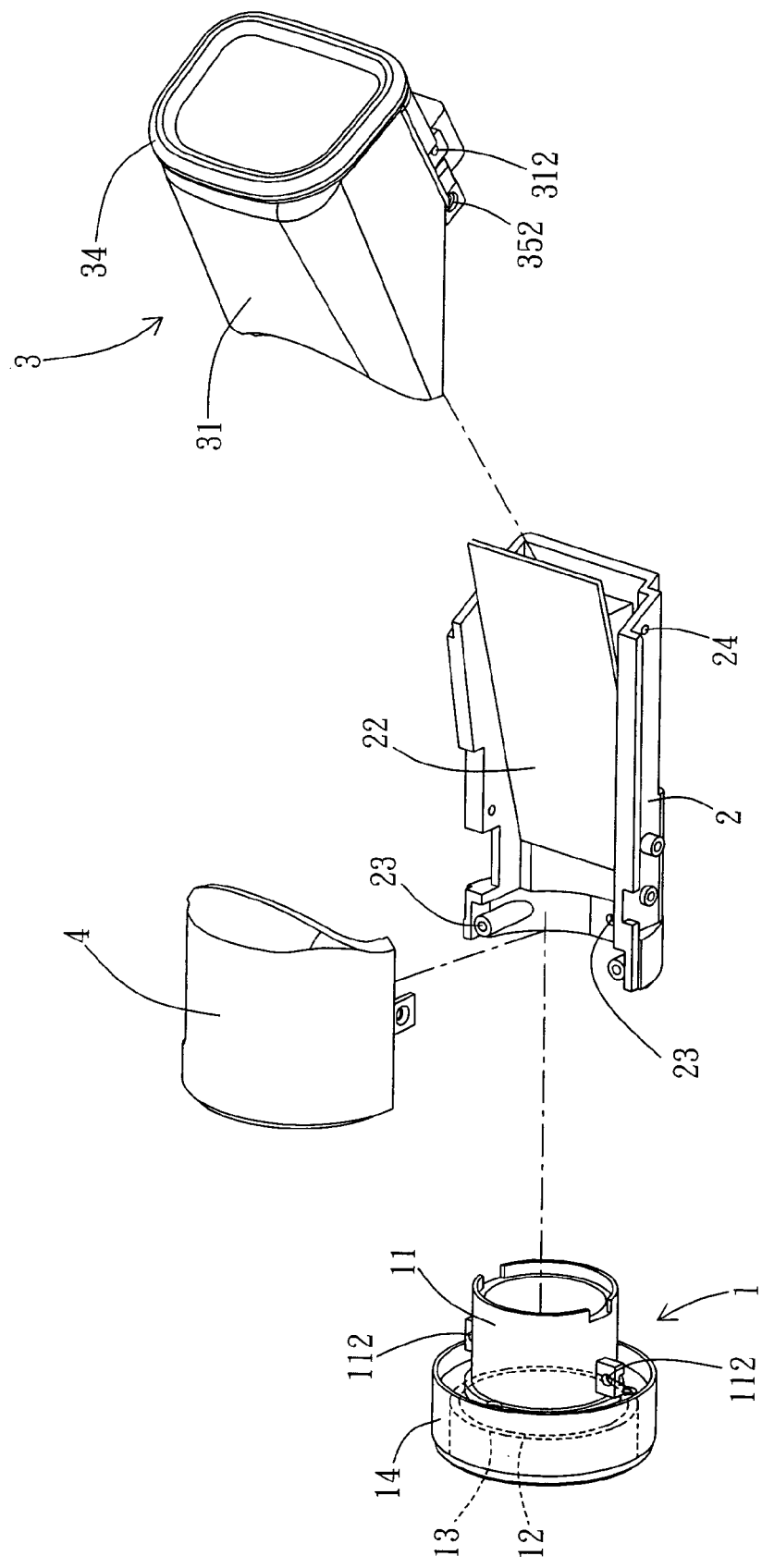
Figure 3:
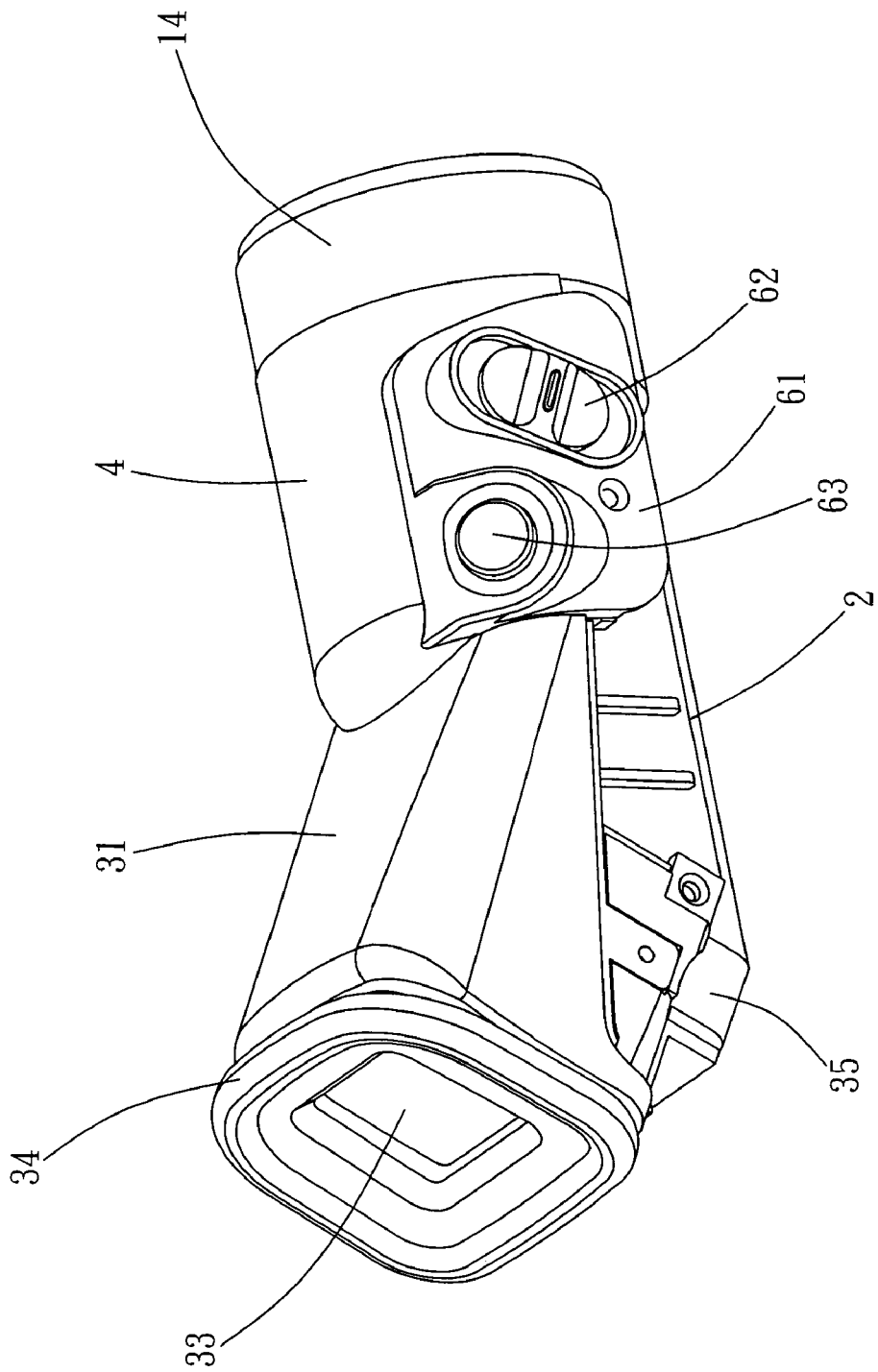
Figure 4:
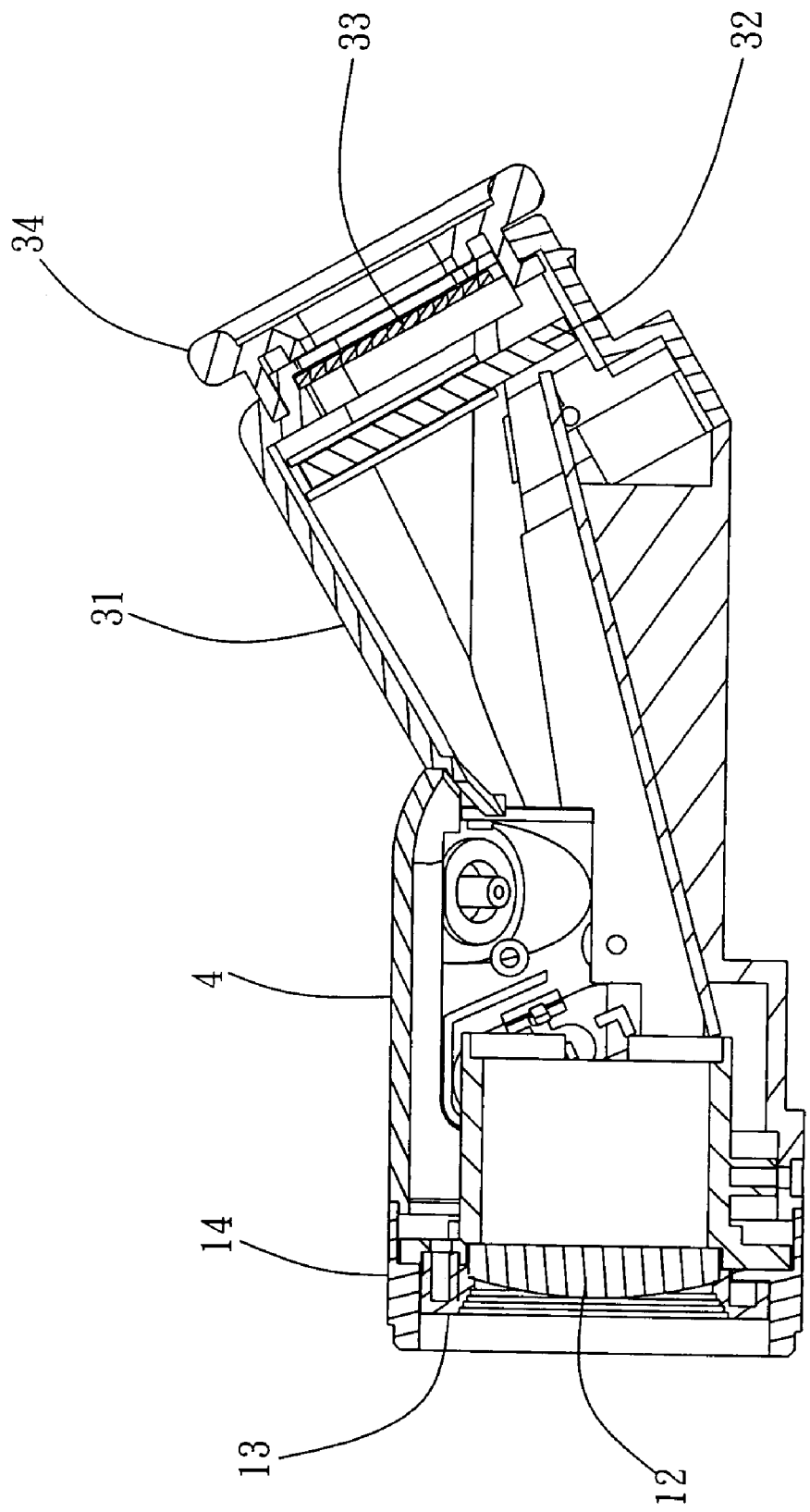
Figure 5:
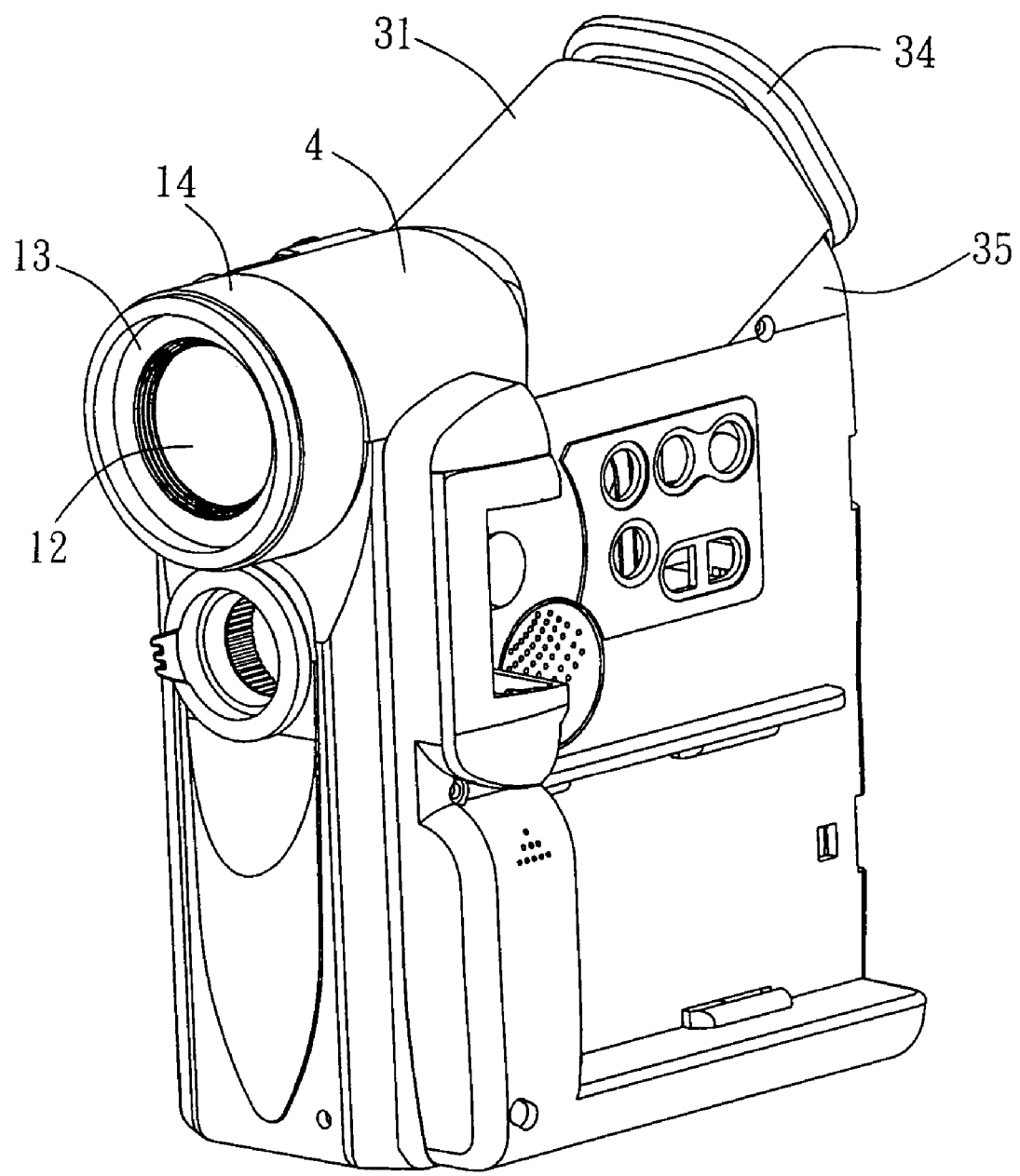

Referring to FIGS. 2 to 4 for the installation of the optical viewfinder of the present invention, the objective module 1, the base 2, and the eyepiece module 3 are assembled as individual modules first, and then the front end and rear end of the base 2 are fixed by a connecting means 5 such as a screw, and the upper casing 4 of the front cylinder together with a control section 6 are connected between the objective module 1 and the eyepiece module 3, and the connecting means 5 is passed through the upper casing 4 of the front cylinder to fix the upper casing 4 of the front cylinder to the middle section of the base 2 as shown in FIG. 2. FIG. 3 shows a perspective view of an optical viewfinder (as depicted in FIG. 2) being assembled according to the present invention and FIG. 5 shows a perspective view of an optical viewfinder being installed to a camera having the function of taking photographs according to the present invention.

Referring to FIG. 4 for the cross-sectional view of an optical viewfinder being installed to a camera having the function of taking photographs according to the present invention, a scene is captured directly by the object lens 12 of the objective module 1, so that the light is incident from the object lens 12, and then a reflective mirror 22 reflects the light to a ground glass eyepiece 32 for forming the image, when a scene is viewed. Now, the viewer can view the picture taken from the plane glass lens 33 in the viewfinder frame 311. Since the scene is viewed directly, therefore the problem of image error can be solved. The invention can achieve the "what you see is what your get" effect.

The present invention further comprises a control section 6 having a button cover 61 installed between the base 2 and the upper casing 4 of the front cylinder, and the button cover 61 includes a focus button 62 and a shutter 63. Since these devices 61, 62, 63 are components of a prior art digital camera, and thus will not be described here.

Since the present invention adopts a modular architecture, the present invention has the easy-to-produce, easy-to-assemble, simple-structured, and high-resolution features. The primary technology resides on the principle and design of optics for the object lens and eyepiece. Furthermore, the manufacturing cost of the optical viewfinder of the present invention is lower than that of the electronic LCD viewfinder, and thus the overall cost of the camera having the function of taking photographs can be lowered to provide consumers an excellent quality and reasonable price of a camera.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. An optical viewfinder of a camera having a function of taking photographs, comprising:
    an objective module, having an object lens installed in a fixed base and a clamping ring engaged onto an opening at the front of said objective module;
    a base, being a base body having an open top and a rectangular aslant surface therein for fixing a reflective mirror and reflecting the light received by said object lens;
    an eyepiece module, installing a ground-glass eyepiece disposed at an upper casing of an aslant rear cylinder having an open bottom for focusing, so as to form images thereon, having a plane glass lens engaged to an opening of a viewfinder frame at the rear of said upper casing of said rear cylinder, and a rear section of the bottom being coupled with a lower casing of said rear cylinder; and
    an upper casing of a front cylinder, being a cover with an open bottom;
    such that said objective module and said eyepiece module are fixed to the front end and the rear end of said base respectively, and said upper casing of said front cylinder is disposed across said objective module and said eyepiece module and fixed to the middle section of said base.

2. The optical viewfinder of a camera having a function of taking photographs of claim 1, wherein said optical viewfinder is fixed and installed to said camera by a connecting means.

3. The optical viewfinder of a camera having a function of taking photographs of claim 1, wherein said fixed base includes an external decorative ring coupled to a base edge extended in a radial direction from the front of said fixed base.

4. The optical viewfinder of a camera having a function of taking photographs of claim 1, wherein said base includes at least two base pillars or base holes disposed at the front end of said base, and said fixed base includes a corresponding base wing or base pillars, and both being coupled by a connecting means such that said objective module is fixed to the front end of said fixed base.

5. The optical viewfinder of a camera having a function of taking photographs of claim 1, wherein said viewfinder frame installs a viewfinder rubber.

6. The optical viewfinder of a camera having a function of taking photographs of claim 1, wherein said upper casing of said rear cylinder includes a cover wing extended downward from the front and rear end of said upper casing of said rear cylinder and inserted into a wing groove at a lower casing of said rear cylinder, and both being coupled by a connecting means, such that said lower casing of said rear cylinder is fixed to the rear section of said upper casing of said rear cylinder.

7. The optical viewfinder of a camera having a function of taking photographs of claim 1, wherein said lower casing of said rear cylinder includes a wing plate protruded from the front end of said lower casing of said rear cylinder, and said base includes a plate hole disposed on a sidewall at the rear end of said base, and both being coupled by a connecting means, such that said eyepiece module is fixed to the rear end of said base.

8. The optical viewfinder of a camera having a function of taking photographs of claim 1, wherein said ground glass eyepiece is made of a plane ground glass.

9. The optical viewfinder of a camera having a function of taking photographs of claim 1, wherein said ground glass eyepiece is made of a spiral ground glass.

10. The optical viewfinder of a camera having a function of taking photographs of claim 1, further comprising a control section, and said control section includes a button cover installed between said base and said upper casing of said front cylinder, and said button cover includes a focus button and a shutter.

* * * * *